(12) United States Patent
Organisciak et al.

(10) Patent No.: US 10,054,229 B2
(45) Date of Patent: Aug. 21, 2018

(54) DYNAMIC RADIAL SEAL

(71) Applicant: Aktiebolaget SKF, Gothenburg (SE)

(72) Inventors: Michel Organisciak, Utrecht (NL); Pieter Baart, Heiloo (NL); Claudio Foti, Poirino (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/504,934

(22) PCT Filed: Jul. 22, 2015

(86) PCT No.: PCT/EP2015/066704
§ 371 (c)(1),
(2) Date: Feb. 17, 2017

(87) PCT Pub. No.: WO2016/030086
PCT Pub. Date: Mar. 3, 2016

(65) Prior Publication Data
US 2017/0268675 A1 Sep. 21, 2017

(30) Foreign Application Priority Data
Aug. 26, 2014 (GB) .................................. 1415049.4

(51) Int. Cl.
*F16J 15/16* (2006.01)
*F16J 15/3216* (2016.01)
*F16C 33/78* (2006.01)

(52) U.S. Cl.
CPC ......... *F16J 15/164* (2013.01); *F16C 33/7823* (2013.01); *F16C 33/7889* (2013.01); *F16J 15/3216* (2013.01)

(58) Field of Classification Search
CPC ................ F16C 33/782; F16C 33/7823; F16C 33/7889; F16J 15/164; F16J 15/3204; F16J 15/3216; F16J 15/322; F16J 15/3224
See application file for complete search history.

(56) References Cited

U.S. PATENT DOCUMENTS 3,006,701 A * 10/1961 Curtis ................... F16C 19/364
384/484
4,974,860 A 12/1990 Anzue et al.
(Continued)

FOREIGN PATENT DOCUMENTS

| EP | 0753677 A1 | 1/1997 |
| EP | 2439430 A1 | 4/2012 |
| WO | 2009156260 A1 | 12/2009 |

*Primary Examiner* — James Pilkington
(74) *Attorney, Agent, or Firm* — Bryan Peckjian; SKF USA Inc. Patent Dept.

(57) ABSTRACT

A seal arrangement for sealing a radial gap between an inner component and an outer component coaxially mounted around the inner component is provided. The inner component rotates about a rotation axis. The arrangement provides a radial seal connectably mounted to the inner component. The radial seal has a sealing lip that bears against a counterface formed by a radially inner surface of the outer component. When the seal arrangement is stationary, the sealing lip bears against the counterface with an initial lip force. The sealing lip is pivotably arranged in a radial cross section around a pivot point, and is in connection with a counterweight. The sealing lip and the counterweight are arranged in different axial regions from the pivot point and are adapted such that during rotation of the radial seal, a greater centrifugal force acts on the counterweight than on the sealing lip.

10 Claims, 2 Drawing Sheets

(56) References Cited

U.S. PATENT DOCUMENTS

| | | |
|---|---|---|
| 6,474,653 B1 | 11/2002 | Hintenlang et al. |
| 7,862,241 B2 * | 1/2011 | Ono .................... F16C 19/386 |
| | | 384/459 |
| 8,356,941 B2 | 1/2013 | Mason et al. |

* cited by examiner

DYNAMIC RADIAL SEAL

CROSS REFERENCE

This is a United States National Stage Application claiming the benefit of International Application Number PCT/EP2015/066704 filed on Jul. 22, 2015, which claims the benefit of British Patent application 1415049.4 filed on Aug. 26, 2014, both of which are incorporated herein by reference in their entireties.

FIELD OF THE INVENTION

The invention relates to a dynamic seal for sealing a radial gap between a rotational component and a non-rotational component, whereby the seal is particularly suitable for high-speed applications.

BACKGROUND OF THE INVENTION

One common application of dynamic seals is to seal the radial gap between a shaft that is rotationally supported within a housing by a bearing. The purpose of the seal is to prevent the entry of contaminants into the housing and to prevent the leakage of e.g. a grease that lubricates the bearing. In many examples, the seal provides a casing element to which an elastomeric body is bonded. The casing may be mounted to the housing and the elastomeric body provides a contact lip that bears against a counterface on the shaft, or on a wear sleeve that is mounted to the shaft. The contact lip ensures a static seal. Under dynamic conditions, however, particularly at high rotational speeds, the friction generated between the contact lip and the counterface can be unacceptably high.

One solution for reducing friction at high speeds is to employ a non-contact labyrinth seal, such as disclosed in U.S. Pat. No. 8,356,941. A seal for a railway axle bearing is described comprising a rotating part mounted to the axle and a stationary part mounted to the bearing outer ring. The rotating part provides a number of radially spaced axial extensions which are arranged between radially spaced axial extensions of the stationary part, to form a labyrinth. To provide an effective labyrinth seal, small gaps are necessary between the opposed surfaces of the rotating and stationary parts of the seal, meaning that the seal can accommodate only small radial and axial displacements between the parts.

A further solution for reducing friction at high speeds in a seal that provides a contact lip is to mount the contact lip in connection with e.g. the rotational shaft and to design the seal such that the lip deflects away from the shaft under the action of centrifugal force. An example of such a solution is disclosed in U.S. Pat. No. 6,474,653.

There is still room for improvement.

BRIEF SUMMARY OF THE INVENTION

The present invention resides in seal arrangement for sealing a radial gap between an inner component and an outer component that is coaxially mounted around the inner component, whereby the inner component is rotational about a rotation axis. The arrangement provides a radial seal that is mounted in connection with the inner component, whereby the radial seal has a sealing lip that bears against a counterface formed by a radially inner surface of the outer component or of a sleeve element that is mounted to the outer component. When the seal arrangement is stationary, the sealing lip bears against the counterface with an initial lip force. According to the invention, the sealing lip is pivotably arranged in a radial cross section around a pivot point, and is in connection with a counterweight. The sealing lip and the counterweight are arranged in different axial regions from the pivot point and are adapted such that during rotation of the radial seal, a greater centrifugal force acts on the counterweight than on the sealing lip.

Thus, at a certain rotational speed, the resultant difference in centrifugal force will be sufficient to cause the sealing lip and the counterweight to rotate about the pivot point, deflecting the sealing lip in a radially inward direction, away from the counterface. This reduces the lip force, meaning that the generated friction is relatively lower.

The sealing lip and the counterweight preferably from part of a seal body that may be made from an elastomeric material. Suitably, the seal body is bonded or moulded to a carrier element, which is mounted to the rotational inner component. The carrier element may have a c-shaped profile, comprising an inner cylindrical portion that is mounted to the inner component and an outer cylindrical portion that is joined to the inner cylindrical portion by a flange portion of the carrier element. The seal thus provides a chamber between the inner and outer cylindrical portions of the carrier element, which, advantageously, creates an additional space for accommodating lubricant.

The seal body is connected to the carrier element at a radially outer surface of the outer cylindrical portion. The seal body thus provides a connection section at the interface with the outer cylindrical portion of the carrier element. In a preferred example, the pivot point is established by a slender region in the seal body that connects the sealing lip and the counterweight to the connection section.

Suitably, the mass (i.e. the inertia) of the sealing lip till the pivot point is less that the mass of the counterweight till the pivot point. The axial extension of the sealing lip from the pivot point is preferably between 50% and 200% of the axial extension of the counterweight from the pivot point.

In some examples, the seal arrangement provides a sleeve element mounted to the outer component. Suitably, the sleeve element has a cylindrical inner surface that forms the counterface for the sealing lip and may be made from metal.

In a further development, the seal body provides a non-contact lip at an axially outer location, relative to the sealing lip. The non-contact lip extends in a radially outward direction and establishes a small radial gap towards the counterface, which gap serves as a labyrinth seal. Furthermore, the radial extension of the non-contact lip serves as flinger during dynamic conditions, which actively repels moisture and contaminants. The non-contact lip thus protects the sealing lip, enhancing the sealing effectiveness of the arrangement as a whole.

A seal arrangement according to the invention is particularly suitable for use in railway bearing units. The outer component may be an outer ring of the bearing or a housing to which the outer ring is mounted. The inner component may be an inner ring of the bearing or an axle to which the inner ring is mounted. The bearings may run at speeds of over 200 km/hr, which places high demands on the sealing arrangement.

As mentioned, the design of the counterweight, sealing lip and pivot point means that the contact force exerted by the sealing lip on the counterface reduces as speed increases. As a result, friction does not become excessively high. In one example, the counterweight, sealing lip and pivot point are designed such that the sealing lip lifts off from the surface at a predetermined rotational speed of e.g. 150 km/hr. The sealing lip then in effect forms part of a labyrinth seal, which will deliver effective sealing at such high rotational speeds without, of course, generating friction.

At speeds below the "lift-off" speed, friction and heat generation are inevitable due to the sliding contact between the sealing lip and the counterface. A further advantage of a seal arrangement according to the invention is improved heat dissipation. In conventional radial lip seals, whereby the sealing lip is in sliding contact with a counterface that is connected to or forms part of the rotational inner component, the generated heat is transferred to the inner component. Especially in the case of a taper roller bearing, this is undesirable. The inner ring of a taper roller bearing has a flange with an axial contact surface for an axially outer end face of the tapered rollers. As a result, more friction is generated between the rollers and the inner ring than between the rollers and the outer ring. Additional heat from the sealing friction is therefore undesirable.

In a seal arrangement according to the invention, the sliding contact takes place between the elastomeric sealing lip and the counterface on the outer component (e.g. bearing outer ring) or on the metal sleeve. The generated heat is therefore conducted to the metal counterface and to the relatively cooler outer component, from where the heat can be more easily dissipated.

Other advantages of the seal arrangement will become apparent from the following detailed description and accompanying FIGURE.

DETAILED DESCRIPTION OF THE INVENTION

Figure 1:
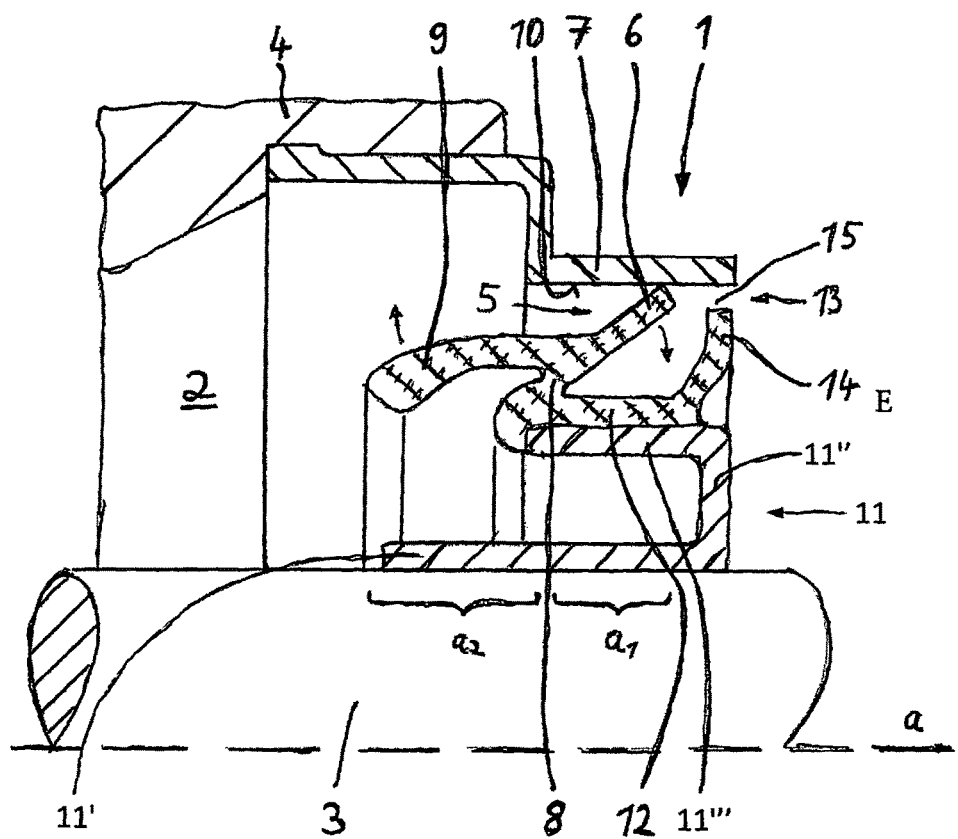
FIG. 1 is a radial cross section through a seal arrangement according to a first embodiment of the present invention which is mounted in a railway bearing unit.
Figure 2:
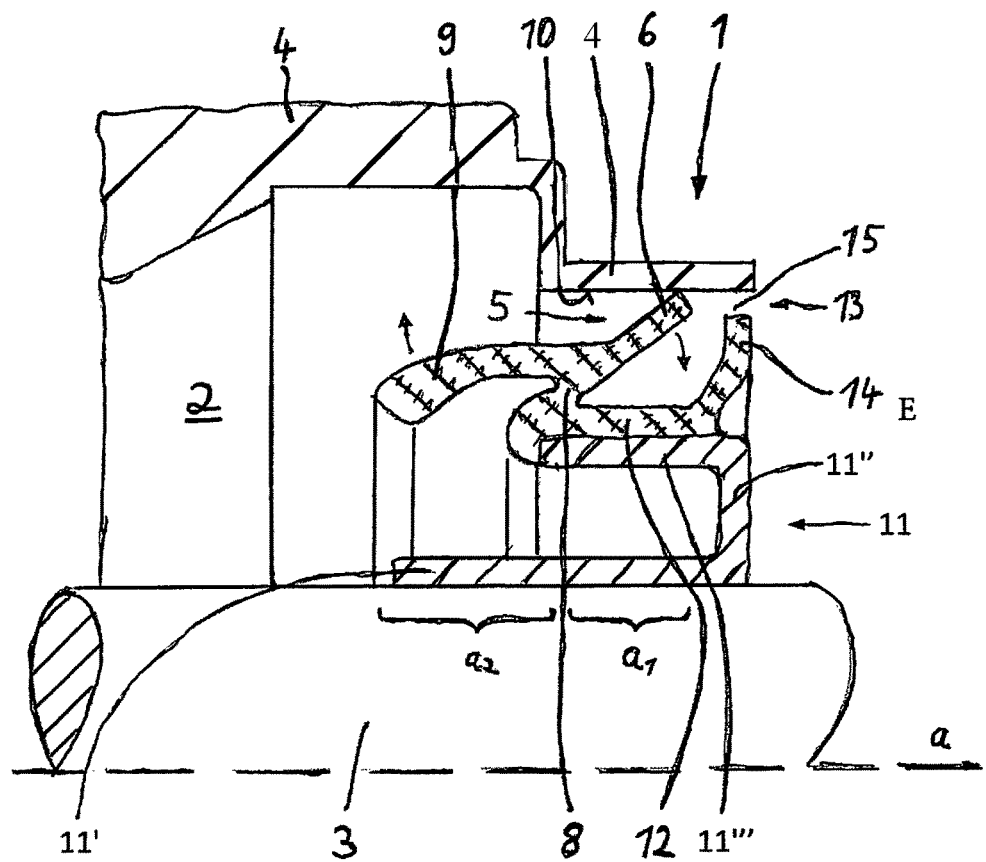
FIG. 2 is a radial cross section through a seal arrangement according to a second embodiment of the present invention which illustrates the lip seal bearing against a counterface on the bearing housing (also referred to as the outer component in the claims).

A sealing arrangement 1 is mounted in a railway bearing unit and seals a bearing arrangement 2 (not shown in detail) against the environment E. The bearing arrangement 2 supports a rotation shaft 3 in a stationary housing 4 (the housing can also be the outer bearing ring). The shaft 3 rotates around an axis a.

The seal arrangement provides a sleeve element 7, which is mounted to the stationary housing 4. The sleeve element is made of metal and has a cylindrical inner surface 10. The seal arrangement further provides a radial seal having an elastomeric seal body 5 that is connected to a carrier element 11, which carrier element is mounted to the shaft 3. The radial seal thus rotates with the shaft.

The carrier element has a C-shaped profile in the depicted embodiment and provides an inner cylindrical portion 11' that is mounted to the shaft 3. At the environmental side E of the seal arrangement, the carrier element further provides a radial flange portion 11", from which an outer cylindrical portion 11''' of the carrier element extends towards the bearing side of the seal arrangement 1. The elastomeric seal body 5 is connected to the carrier element 11 at a radially outer surface of the outer cylindrical portion 11'''.

The elastomeric body 5 provides a sealing lip 6 which, during rotation of the shaft, is in sliding contact with the inner cylindrical surface 10 of the sleeve element, which will be referred to as the counterface 10.

When the seal arrangement is at rest, i.e. under static sealing conditions, the sealing lip exerts a certain contact force on the counterface 10. Under dynamic sealing conditions, the centrifugal force acting on the radial seal would tend to increase the contact force, which would obviously be detrimental in terms of increasing the friction generated at the sliding contact.

To avoid this drawback, the following structure is proposed:

The sealing lip 6 is pivotably arranged in a radial cross section around a pivot point 8 (in the FIGURE, the pivot axis is thus perpendicular to the drawing plane). Furthermore, the elastomeric seal body 5 provides a counterweight 9 in connection with the sealing lip 6. As can be seen from the FIGURE, the sealing lip 6 and the counterweight 9 are arranged in different axial regions $a^1$ and $a^2$ respectively from the pivot point 8. The elastomeric seal body 5 further provides a connection section 12 that is joined to the outer cylindrical portion 11''' the carrier element. The elastomeric seal body 5 may be joined to the carrier element 11 by means of vulcanization, adhesive bonding or any other suitable joining process.

The pivot point 8 is formed by a relatively slender region of the seal body 5 which joins the counterweight 9 and sealing lip 6 to the connection section 12. The bending stiffness of the sealing lip 6 together with the connection section 12 around the pivot axis is higher (at least two times as high) than the bending stiffness of the sealing lip together with the counterweight 9. Thus, it is possible for the counterweight 9 and the sealing lip 6 to pivot about the pivot point 8.

Such a pivoting action is achieved during rotation of the shaft 3 and radial seal in that the counterweight and sealing lip are designed such that the centrifugal force acting on the counterweight 9 is higher than the centrifugal force acting on the sealing lip 6. Suitably, the mass of the counterweight is greater than the mass of the sealing lip. Due to the higher centrifugal force on the counterweight 9, a pivoting movement takes place which is denoted by the two unreferenced arrows in the figure. Thus, the contact force exerted by the sealing lip 6 on the counterface 10 decreases as the rotation speed increases, thereby minimizing the associated increase in sliding friction. Furthermore, at high rotation speeds, the sealing lip will lift off from the counterface 10, thereby eliminating sliding friction. The sealing arrangement 1 is thus suitable for use in a railway bearing unit which rotates at speeds in excess of 200 km/hr.

To provide additional protection against moisture and particulate contaminants from the environment E, the sealing arrangement 1 further provides a labyrinth seal 13 at an axially outer side of the arrangement. The labyrinth seal is formed by a small radial gap between the counterface 10 and a non-contact lip 14 that extends in a radial direction from the connection section 12 of the elastomeric seal body. During dynamic sealing, the radial extension of the non-contact lip 14 acts as a flinger that actively repels contamination. The non-contact lip 14 therefore helps to prevent contaminants from reaching the interface between the sealing lip 6 and the counterface 10, making it even more difficult for contaminants from the environment E to enter the bearing arrangement 2.

The invention is not restricted to the depicted embodiment, but is to be interpreted within the scope of the following claims.

REFERENCE NUMERALS

1 Sealing arrangement
2 Bearing arrangement
3 Inner component (shaft)
4 Outer component (bearing housing)
5 Elastomeric body of radial seal
6 Sealing lip of radial seal
7 Sleeve element
8 Pivot point
9 Counterweight
10 Counterface
11 Carrier element of radial seal
11' Inner cylindrical portion of carrier element
11" Radial flange portion of carrier element
11''' Outer cylindrical portion of carrier element
12 Connection section of elastomeric seal body
13 Labyrinth seal
14 Non-contact lip
15 Gap (labyrinth seal)
E Environment
a Axis
$a^1$ Axial region of sealing lip relative to pivot point
$a^2$ Axial region of counterweight relative to pivot point

The invention claimed is:

1. A seal arrangement for sealing a radial gap between an inner component and an outer component, wherein the inner component rotates about an axis and the outer component is non-rotational and is mounted coaxially around the inner component, the seal arrangement comprising:
 a radial seal mounted to the inner component, wherein the radial seal provides a sealing lip which, under static sealing conditions, bears against a counterface formed by a radially inner surface of the outer component or of a sleeve element that is mounted to the outer component;
 the sealing lip is pivotably arranged in a radial cross section around a pivot point, wherein the pivot point lies radially inward of the counterface;
 the radial seal further comprises a counterweight connected to the sealing lip, and the sealing lip and the counterweight are arranged in different axial regions from the pivot point wherein, under dynamic sealing conditions, a centrifugal force acting on the counterweight is greater than the centrifugal force acting on the sealing lip; and
 a labyrinth seal arranged at a location axially adjacent to the sealing lip on a side of the sealing lip opposite from the counterweight.

2. The seal arrangement according to claim 1, wherein a mass of the sealing lip from an end of the sealing lip to the pivot point is less than a mass of the counterweight from an end of the counterweight to the pivot point.

3. The seal arrangement according to claim 1, wherein the sealing lip and the counterweight form part of an elastomeric seal body of the radial seal.

4. The seal arrangement according to claim 3, wherein the radial seal comprises a carrier element mounted to the inner component, the carrier element comprising an inner cylindrical portion and an outer cylindrical portion joined by a radially extending flange portion.

5. The seal arrangement according to claim 4, wherein the elastomeric seal body comprises a connection section that is joined to the carrier element at a radially outer surface of the outer cylindrical portion.

6. The seal arrangement according to claim 5, wherein the elastomeric body further comprises a region between the connection section and the sealing lip and counterweight, wherein the pivot point is established by the region.

7. A seal arrangement for sealing a radial gap between an inner component and an outer component, wherein the inner component rotates about an axis and the outer component is non-rotational and is mounted coaxially around the inner component, the seal arrangement comprising:
 a radial seal mounted to the inner component, wherein the radial seal provides a sealing lip which, under static sealing conditions, bears against a counterface formed by a radially inner surface of the outer component or of a sleeve element that is mounted to the outer component;
 wherein the sealing lip is pivotably arranged in a radial cross section around a pivot point, wherein the pivot point lies radially inward of the counterface;
 a counterweight connected to the sealing lip, and the sealing lip and the counterweight are arranged in different axial regions from the pivot point wherein, under dynamic sealing conditions, a centrifugal force acting on the counterweight is greater than the centrifugal force acting on the sealing lip, wherein the sealing lip and the counterweight form part of an elastomeric seal body of the radial seal;
 wherein the radial seal comprises a carrier element mounted to the inner component, the carrier element comprising an inner cylindrical portion and an outer cylindrical portion joined by a radially extending flange portion; and
 wherein the elastomeric seal body comprises a connection section that is joined to the carrier element at a radially outer surface of the outer cylindrical portion, wherein the elastomeric seal body further comprises a non-contact lip that extends from the connection section in a radially outward direction towards the counterface, a labyrinth seal arranged at a location axially adjacent to the sealing lip on a side of the sealing lip opposite from the counterweight, the labyrinth seal being formed by a radial gap between the counterface and the non-contact lip.

8. The seal arrangement according to claim 1, wherein the inner component is a shaft or a bearing inner ring and the outer component is a housing or a bearing outer ring.

9. A bearing unit comprising the seal arrangement according to claim 1.

10. The bearing unit according to claim 9, wherein the bearing unit is a railway bearing unit comprising a double-row taper roller bearing.

\* \* \* \* \*